(12) United States Patent  
Suzuki et al.

(10) Patent No.: US 12,418,822 B2
(45) Date of Patent: Sep. 16, 2025

(54) COMMUNICATION RELAY DEVICE, COMMUNICATION CONTROL METHOD, AND NON-TRANSITORY COMPUTER READABLE STORAGE MEDIUM

(71) Applicant: YAMAHA CORPORATION, Hamamatsu (JP)

(72) Inventors: Shuntaro Suzuki, Shizuoka (JP); Hirokazu Suzuki, Yokohama (JP)

(73) Assignee: YAMAHA CORPORATION, Hamamatsu (JP)

( * ) Notice: Subject to any disclaimer, the term of this patent is extended or adjusted under 35 U.S.C. 154(b) by 423 days.

(21) Appl. No.: 18/057,358

(22) Filed: Nov. 21, 2022

(65) Prior Publication Data
US 2023/0189051 A1    Jun. 15, 2023

(30) Foreign Application Priority Data
Dec. 13, 2021  (JP) .................................. 2021-201998

(51) Int. Cl.
  *H04W 28/02*    (2009.01)
(52) U.S. Cl.
  CPC .............................. *H04W 28/0236* (2013.01)
(58) Field of Classification Search
  None
  See application file for complete search history.

(56) References Cited

U.S. PATENT DOCUMENTS

| | | | | |
|---|---|---|---|---|
| 2009/0157443 A1* | 6/2009 | Gracieux | ............... | G06Q 50/06 705/63 |
| 2011/0096729 A1* | 4/2011 | Yamaura | ............... | H04B 1/401 370/328 |
| 2011/0267958 A1* | 11/2011 | Sekiya | ............... | G01S 7/021 370/241 |
| 2014/0149562 A1* | 5/2014 | Xiao | ............... | H04L 67/535 709/222 |
| 2017/0269558 A1* | 9/2017 | Sekitsuka | ............... | G04R 20/06 |
| 2018/0162150 A1* | 6/2018 | Zhai | ............... | B41J 19/142 |

(Continued)

FOREIGN PATENT DOCUMENTS

| | | |
|---|---|---|
| JP | 2010050625 A | 3/2010 |
| JP | 2011166286 A | 8/2011 |

(Continued)

OTHER PUBLICATIONS

Office Action issued in Japanese Appln. No. 2021-201998 mailed Jul. 8, 2025.

*Primary Examiner* — Wutchung Chu
*Assistant Examiner* — Berhanu D Belete
(74) *Attorney, Agent, or Firm* — ROSSI, KIMMS & McDOWELL LLP

(57) ABSTRACT

A communication relay device includes a plurality of wireless communication modules; a processor; and a memory configured to store a program, the program being executable by the processor to cause the processor to: acquire a designated bandwidth and internal information of the communication relay device; and set a number of wireless communication modules among the plurality of wireless communication modules to be used for communication by the communication relay device based on the designated bandwidth and the internal information of the communication relay device.

15 Claims, 13 Drawing Sheets

(56) References Cited

U.S. PATENT DOCUMENTS

| | | | |
|---|---|---|---|
| 2018/0313880 A1* | 11/2018 | Logan | G01R 23/155 |
| 2020/0029339 A1* | 1/2020 | Suzuki | H04K 3/226 |
| 2021/0141108 A1* | 5/2021 | Sheeks | G01P 15/09 |
| 2021/0153031 A1* | 5/2021 | Sugaya | H04W 72/0453 |
| 2021/0270951 A1* | 9/2021 | Yoshizawa | H04W 72/12 |

FOREIGN PATENT DOCUMENTS

| | | |
|---|---|---|
| JP | 2020182129 A | 11/2020 |
| WO | 2017022111 A1 | 2/2017 |

* cited by examiner

| Condition | Bandwidths desired by a user | Radar signal detection frequency | Threshold Nth2 for the number of connected communication terminals |
|---|---|---|---|
| f1 | 5Mbps | low | 60 |
| f2 | 20Mbps | low | 15 |
| f3 | 5Mbps | high | 96 |
| f4 | 20Mbps | high | 24 |

101, 103, 105, 107

COMMUNICATION RELAY DEVICE, COMMUNICATION CONTROL METHOD, AND NON-TRANSITORY COMPUTER READABLE STORAGE MEDIUM

CROSS-REFERENCE TO RELATED APPLICATIONS

This application claims the benefit of priority to Japanese Patent Application No. 2021-201998, filed on Dec. 13, 2021, the entire contents of which are incorporated herein by reference.

TECHNICAL FIELD

The present disclosure relates to a communication relay device, a communication control method, and a non-transitory computer readable storage medium.

BACKGROUND

In wireless communication such as a wireless LAN, the 2.4 GHz band and the 5 GHz band are used as communication bands. In the use of the bands called W53 and W56 among the 5 GHz band, a function for avoiding interference with specific radar waves (also referred to as radar signals) such as military and weather is implemented. This function is called a DFS (Dynamic Frequency Selection) function. The DFS function executes the following processing. First, when wireless communication is started using a channel classified as the W53/W56, it is necessary to confirm that a specific radar signal is not detected for one minute before starting wireless communication. This process is called a CAC (Channel Availability Check). In addition, if a radar signal is detected in the CAC, the use of that channel must be stopped for 30 minutes to prioritize the use of the radar signal. Generally, when a radar signal is detected, the channel is changed to attempt to resume wireless communication. However, after the radar signal is detected, wireless communication cannot be performed for one minute even if a channel that is not used by the radar signal is newly used. Also, the state of performing wireless communication is referred to as ISM (In-Service Monitoring). Japanese laid-open patent publication No. 2020-182129 discloses switching channels when it is determined that interference with a radar signal has occurred based on a communication log of a wireless LAN.

In addition, some access points include a plurality of wireless modules depending on bandwidth. When a single wireless module is used for a wireless communication service, (1) power consumption can be reduced, (2) another wireless module is used for radar monitoring, (3) another wireless module is used for connection with another wireless LAN system (for example, WDS bridge function), and the like are advantageous. On the other hand, when a plurality of wireless modules is used for a wireless communication service, there is an advantage that a communication band in the wireless LAN system can be increased.

SUMMARY

According to an embodiment of the present disclosure, there is provided a communication relay device including: a plurality of wireless communication modules; a processor; and a memory configured to store a program, the program being executable by the processor to cause the processor to: acquire a designated bandwidth and internal information of the communication relay device; and set a number of wireless communication modules among the plurality of wireless communication modules to be used for communication by the communication relay device based on the designated bandwidth and the internal information of the communication relay device.

In addition, according to an embodiment of the present disclosure, there is provided a communication control method, including: acquiring a designated bandwidth and internal information of a communication relay device comprising a plurality of wireless communication modules; and setting a number of wireless communication modules among the plurality of wireless communication modules to be used for communication by the communication relay device based on the designated bandwidth and the internal information of the communication relay device.

According to an embodiment of the present disclosure, there is provided a non-transitory computer readable storage medium storing a program for causing a computer to: acquire a designated bandwidth and internal information of a communication relay device comprising a plurality of wireless communication modules; and set a number of wireless communication modules among the plurality of wireless communication modules to be used for communication by the communication relay device based on the designated bandwidth and the internal information of the communication relay device.

BRIEF DESCRIPTION OF DRAWINGS

FIG. 5 is a diagram illustrating a threshold management table according to the first embodiment of the present disclosure.

DESCRIPTION OF EMBODIMENTS

Figure 1:
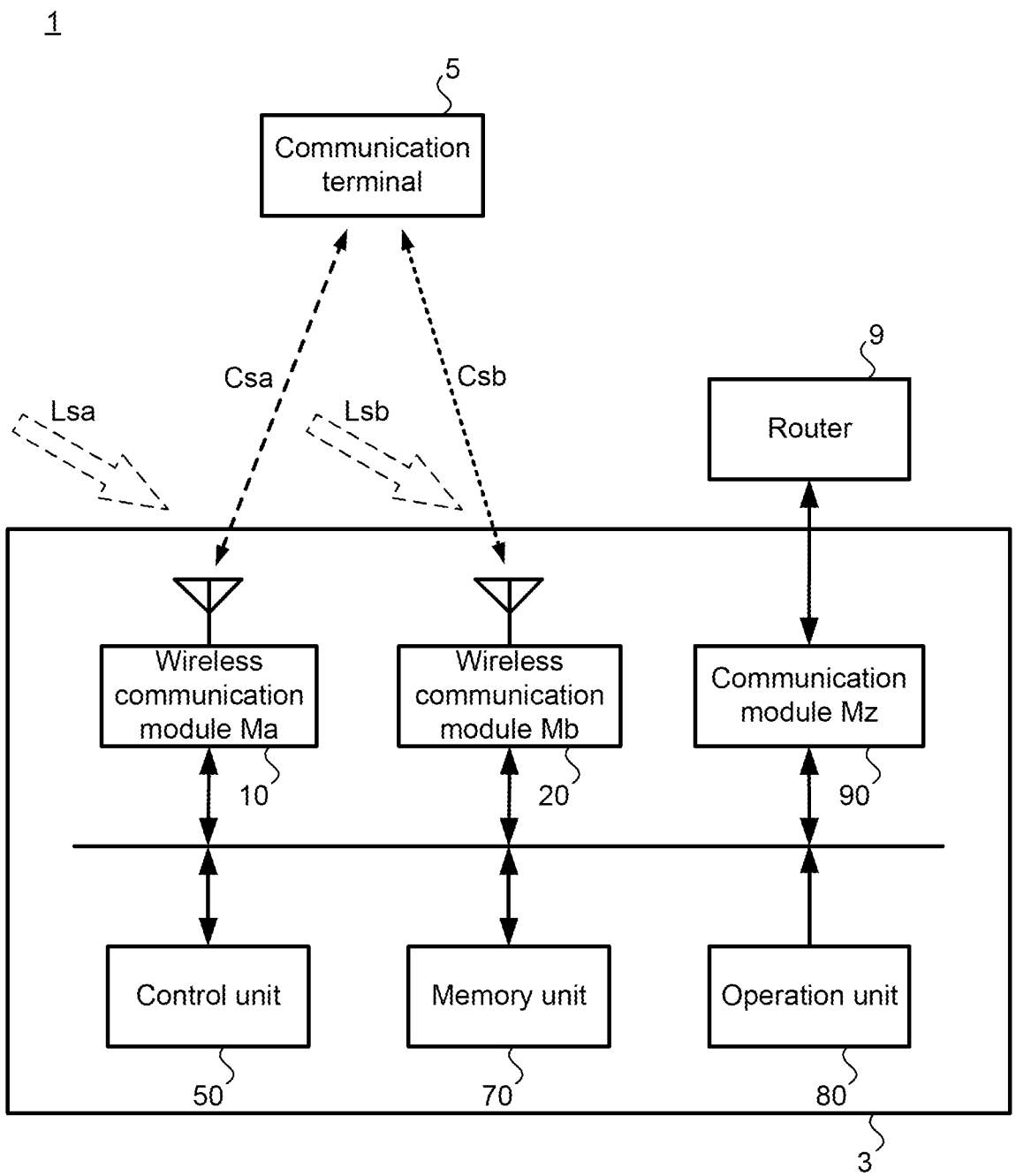
FIG. 1 is a diagram illustrating a configuration of a communication system according to a first embodiment of the present disclosure.

Hereinafter, a communication system according to an embodiment of the present disclosure will be described in detail with reference to the drawings. The following embodiments are examples of embodiments of the present disclosure, and the present disclosure should not be construed as being limited to these embodiments. Also, in the drawings referred to in the present embodiments, the same portions or portions having similar functions are denoted by the same symbols or similar symbols (symbols each formed simply by adding A, B, etc. to the end of a number), and a repetitive description thereof may be omitted.

It is difficult for a user to know a wireless communication environment used by himself/herself. Therefore, even if an attempt is made to change the number of wireless communication modules to be used for communication when the wireless environment is congested, it is not known which condition should be used to determine their decision. Furthermore, it is very complicated for the user to manually set the number of wireless modules to be changed.

The present disclosure discloses making an appropriate wireless communication setting according to the user's usage environment.

First Embodiment

[1-1. Overall Configuration of Communication System]

A communication system according to the first embodiment of the present disclosure is realized by an access point that relays wireless communication. The access point is a communication device that performs wireless communication using at least the 5 GHz band. The access point is capable of executing a process corresponding to a DFS function. In this case, the access point can adjust an appropriate number of wireless communication modules according to a bandwidth desired by a user by the method described below. Hereinafter, the access point according to the first embodiment will be described. Also, the communication system may be realized by another communication device such as a router or a network switch in place of the access point.

[1-2. Access Point Configuration]

FIG. 1 is a diagram illustrating a configuration of a communication system 1 according to a first embodiment of the present disclosure. An access point 3 is a device that provides a wireless LAN environment to a communication terminal 5. The access point 3 is a device that relays the communication terminal 5 to a WAN (e.g., the Internet) via a router 9. Although one communication terminal 5 is shown in FIG. 1, there may be a plurality of communication terminals 5.

The access point 3 includes a wireless communication module Ma 10, a wireless communication module Mb 20, a control unit 50, a memory unit 70, an operation unit 80, and a wireless communication module Mz 90. These configurations are connected to each other by a bus. The communication system 1 in this example includes the wireless communication module Ma 10, the wireless communication module Mb 20, and the control unit 50, and they are accommodated in one housing to form a part of the access point 3. Also, in the present embodiment, the wireless communication module Ma 10 and the wireless communication module Mb 20 will be described as the wireless communication module M when there is no need to describe them separately.

The wireless communication module Ma 10 executes wireless communication Csa with the communication terminal 5 and detects a radar signal Lsa using a channel set by the control unit 50 among the channels in the 5 GHz band. The channel (also referred to as a first channel) set in the wireless communication module Ma 10 is selected from channels included in types W53 and W56 in the IEEE802.11 standard.

The wireless communication module Mb 20 executes wireless communication Csb with the communication terminal 5 and detects a radar signal Lsb using the channel set by the control unit 50 among the channels in the 5 GHz band. The channel (also referred to as a second channel) set in the wireless communication module Mb 20 is a channel that is different from the channel set in the wireless communication module Ma 10. However, the channels are the same in that they are selected from the channels included in the types W53 and W56. Also, a channel included in the type W52, that is, a channel not to be detected by the radar signal, may be set in the wireless communication module Ma 10 and the wireless communication module Mb 20.

The radar signals Lsa and Lsb are described using different expressions for convenience in order to distinguish the wireless communication module that can be detected by the channel. Therefore, in the case where the detectable wireless communication module is described as a common matter without being distinguished, it may be described as a radar signal Ls.

As described above, although the wireless communication module Ma 10 and the wireless communication module Mb 20 are different from each other in the channel to be set, it is desirable that the other settings (for example, a transmission/reception rate set and a security setting) are the same. In this way, even if the wireless communication module communicating with the communication terminal 5 is changed, the communication terminal 5 can communicate as it is by changing the setting of the channel to be used. Also, some settings may be different between the wireless communication module Ma 10 and the wireless communication module Mb 20.

In this example, the wireless communication module Mz 90 has a function of a communication unit for communicating with other devices via the router 9. For example, this communication may be wireless using a 2.4 GHz band or wired.

The memory unit 70 stores a control program executed by the control unit 50 and various data tables, and the like. For example, the memory unit 70 stores threshold data of the number of communication terminals to be connected, which will be described later, and is updated by the control unit 50 as appropriate. The operation unit 80 includes operators such as a power button and a setting button, receives user's operations on the operator, and outputs a signal corresponding to the operation to the control unit 50.

The control unit 50 includes a calculation processing circuit, such as a CPU, and a memory. The control unit 50 executes the control program stored in the memory unit 70 by the CPU to realize various functions in the access point 3. The realized functions include a communication control function. According to this communication control function, it is possible to execute a process to be described later (hereinafter, referred to as a communication control process).

The control program may be executed by a computer and may be provided in a state of being stored in a computer-readable recording medium such as a magnetic recording medium, an optical recording medium, a magneto-optical recording medium, or a semiconductor memory. In this case, the access point 3 may include a device for reading the recording medium. In addition, the control program may be downloaded via the wireless communication module. Next, the communication control process (communication control method) will be described.

[1-3. Communication Control Process]

Figure 2:
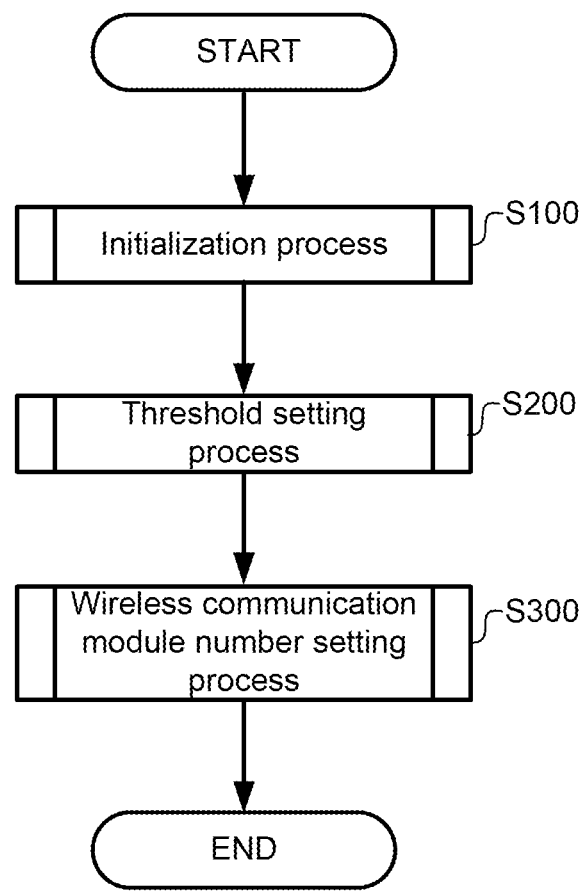
FIG. 2 is a flowchart illustrating a communication control processing according to the first embodiment of the present disclosure.
Figure 3:
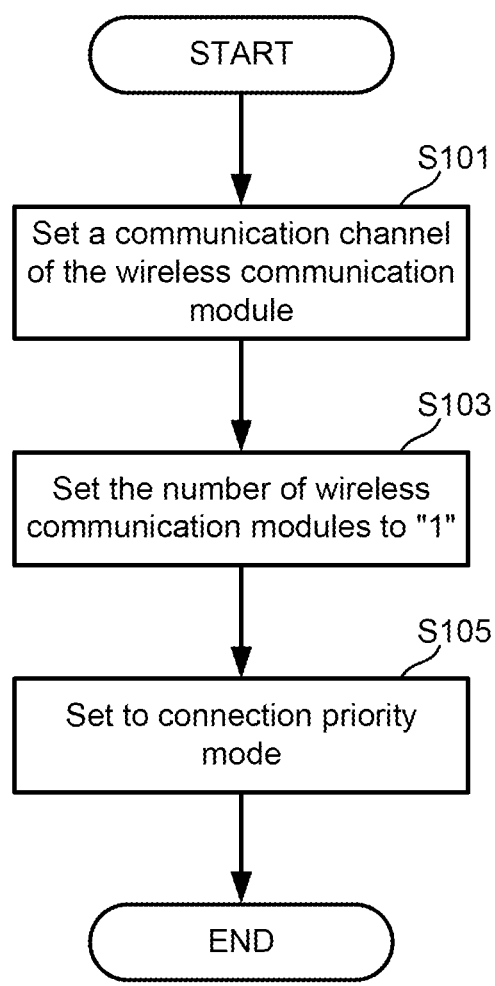
FIG. 3 is a flowchart illustrating an initialization process according to the first embodiment of the present disclosure.

The communication control process is started when the power is turned on at the access point 3. Also, the communication control process may be started by a request for starting the communication control process (start setting) from the user. FIG. 2 is a flowchart illustrating a communication control process according to the first embodiment of the present disclosure. In the present embodiment, the communication control process includes an initialization process S100, a threshold setting process S200, and a setting process of the number of wireless communication modules S300. The initialization process S100 is a process for setting an initialization condition of the wireless communication module M of the access point 3. The threshold setting process S200 is a process for setting a threshold according to a desired bandwidth input by the user. The setting process of the number of wireless communication modules S300 is a process for setting the number of wireless communication modules to be used for wireless communication according to the number of communication terminals connected to the wireless communication module M and the bandwidth desired by the user. When the communication control process is started, first, the control unit 50 executes the initialization process S100.

[1-3-1. Initialization Process]

When the initialization process S100 is started, the control unit 50 sets a channel used for wireless communication to the wireless communication modules Ma 10 and Mb 20 (step S101). The set channel may be a predetermined channel, a channel set at last power off, or may be determined according to a past history (e.g., channel usage frequency, detection frequency of the radar signal Ls, and the like). In addition, a channel that is not currently in use (vacant) may be set. Such a setting may be registered in the wireless communication module managing table stored in the memory unit 70. Also, the channel (the first channel) set in the wireless communication module Ma 10 and the channel (the second channel) set in the wireless communication module Mb 20 are set differently.

In the current standard, the use of the channel that detects the radar signal Ls is limited to 30 minutes. Therefore, if this standard exists, the channel of the wireless communication module M is assumed to be changed, and the control unit 50 controls the channel so that the channel cannot be used by any of the wireless communication modules M for 30 minutes after the radar signal Ls is detected. In the initialization process, the control unit 50 sets the number of wireless communication modules to be used to "1" (step S103). In this case, the control unit 50 sets the wireless communication module M to a connection priority mode (step S105).

In the connection priority mode, the access point 3 is operated such that one of the wireless communication modules M (for example, the wireless communication module Ma 10) among the wireless communication modules Ma 10 and Mb 20 is connected (also referred to as a first connection) to the communication terminal 5 (also referred to as ISM or an unrestricted state), and the other wireless communication module M (for example, the wireless communication module Mb 20) detects the radar signal Ls (also referred to as CAC or a restricted state), and the radar signal Ls is detected in both states.

When the wireless communication module Mb 20 detects the radar signal Ls in the connection priority mode, the CAC is started in the wireless communication module Mb 20. In this case, the channel of the wireless communication module Mb 20 may or may not be changed. On the other hand, when the wireless communication module Ma 10 detects the radar signal Ls, the control unit 50 changes the wireless communication module Mb 20 to the unrestricted state (ISM) and changes the wireless communication module Ma 10 to the restricted state (CAC). As a result, in the connection priority mode, the wireless communication is started by disconnecting the communication between the communication terminal 5 and the wireless communication module Ma 10 and changing the setting to the connection (also referred to as a second connection) between the communication terminal 5 and the wireless communication module Mb 20. In this case, in the communication terminal 5, the channel of the wireless communication may be changed while continuing to communicate with the access point 3. Therefore, a period during which wireless communication cannot be performed hardly occurs. According to the connection priority mode, it is possible to reduce the period during which wireless communication cannot be performed as much as possible when the radar signal Ls is received.

[1-3-2. Threshold Setting Process]

Figure 4:
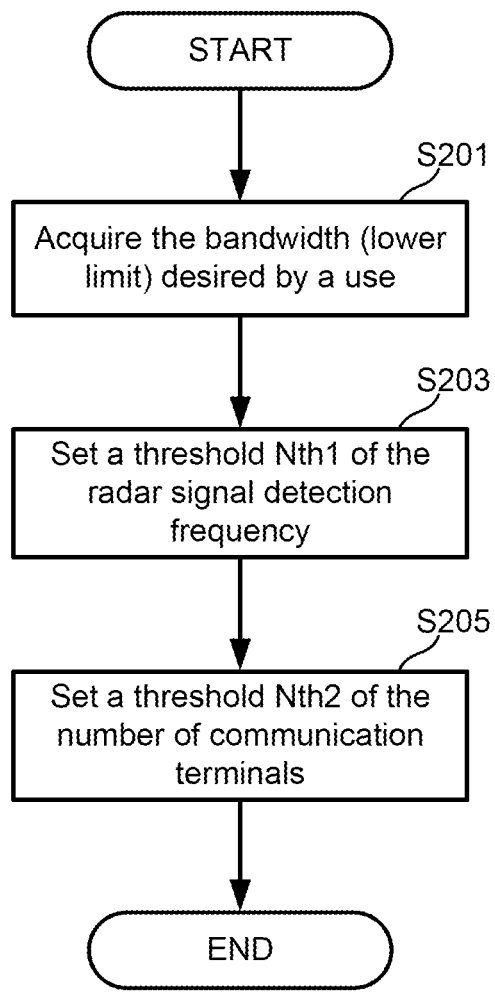
FIG. 4 is a flowchart illustrating a threshold setting process according to the first embodiment of the present disclosure.

FIG. 4 is a flowchart illustrating the threshold setting process S200. The control unit 50 starts the threshold setting process S200 while the connection priority mode process is being executed.

In the threshold setting process S200, first, the user inputs a desired bandwidth (for example, a lower limit of the bandwidth) to the access point 3. The control unit 50 acquires the input bandwidth desired by the user (S201). Information of the acquired bandwidth is stored in the memory unit 70.

The control unit 50 sets a threshold Nth1 of the detection frequency of the radar signal Ls based on the acquired bandwidth (S203). The detection frequency of the radar signal Ls indicates the number of detections of the radar signal detected by the wireless communication module M within a predetermined period. For example, the control unit 50 counts how many times the radar signal is detected in 24 hours when the wireless communication module M detects the radar signal every 5 minutes. "1" is set as the threshold Nth1 of the radar signal detection frequency.

The control unit 50 sets a threshold Nth2 of the number of communication terminals connected to the wireless communication module M(S205). The threshold Nth2 is calculated by Equation 1 below.

$$\text{Threshold } Nth2 \text{ of the number of terminals to be connected} = \frac{\text{Theorical value of the bandwidth in the communication standard} \times \text{the number of communication modules} \times \text{coefficient}}{\text{Bandwidth per communication terminal desired by a user}}$$

In Equation 1, the threshold Nth2 is calculated based on a theoretical value of the bandwidth (communication rate) in a predetermined communication standard, the number of wireless communication modules used for wireless communication, and a predetermined coefficient in addition to a bandwidth per communication terminal desired by the user. The coefficient is set based on the bandwidth desired by the user and the detection frequency of the radar signal. The predetermined communication standard in the present embodiment is 802.11 ac. The theoretical value when a predetermined parameter (e.g., MSC index 9, Spatial Stream 2, bandwidth 80 MHz, guard interval length: 0.4 μs) in this communication standard is used is 866.7 Mbps. The number of antennas is four (two for transmission and two for reception). Also, another parameter (such as MCS index) of the communication standard 802.11ac may be used, or the communication standard is not limited to 802.11 ac, and another communication standard may be used.

FIG. 5 is an example of a threshold management table 100 of the number of communication terminals to be connected. The threshold management table 100 includes a condition 101, a bandwidth 103 desired by the user, a radar signal detection frequency 105, and a threshold 107 for the number of communication terminals to be connected. In a condition Nth2a, the bandwidth "5 Mbps" per communication terminal desired by the user and the radar signal detection frequency "low" are set, and "60" is set as the threshold Nth2 of the number of communication terminals to be connected. Also, the radar signal detection frequency "low" refers to the case where the detection frequency of the radar signal is less than two times. The radar signal detection frequency "high" refers to the case where the detection frequency of the radar signal is two or more times.

When the process (S205) for determining the threshold for the number of communication terminals to be connected ends, the control unit 50 starts the setting process of the number of wireless communication modules S300 to be used based on the number of communication terminals currently connected.

[1-3-3. The Setting Process of Number of Wireless Communication Modules]

Figure 6:
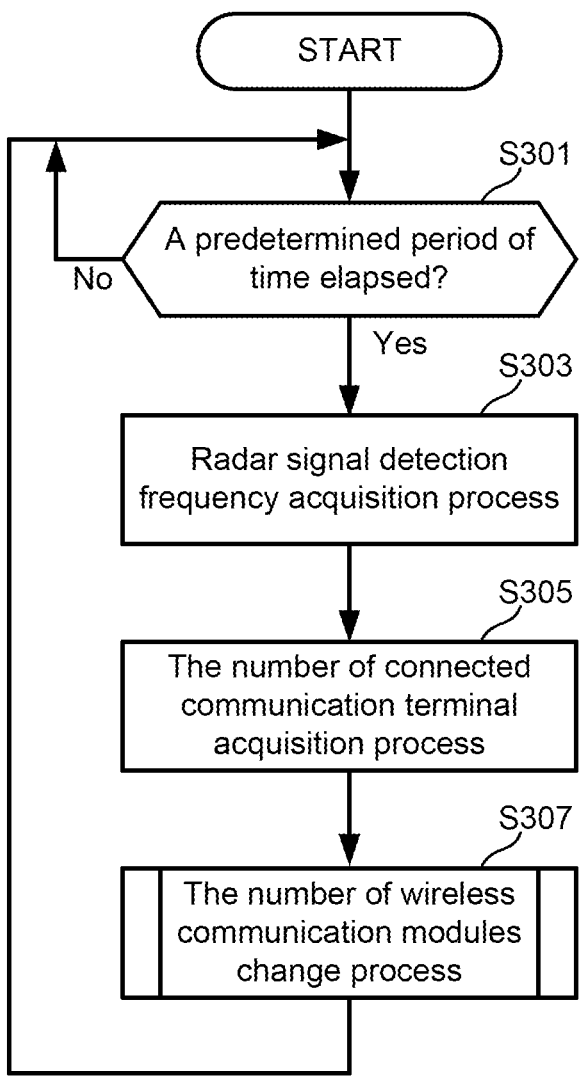
FIG. 6 is a flowchart illustrating a process of setting the number of wireless communication modules according to the first embodiment of the present disclosure.

FIG. 6 is a flowchart illustrating a setting process of the number of wireless communication modules S300. In the setting process of the number of wireless communication modules S300, first, the control unit 50 waits until a predetermined period of time elapses (S301; No). When the predetermined period elapses (S301; Yes), the control unit 50 acquires internal information of the access point 3. The control unit 50 acquires the number of detections (detection frequency) of the radar signal Ls detected by the wireless communication module M in a predetermined period (S303). The detection frequency of the acquired radar signal Ls is stored in the memory unit 70. In addition, the control unit 50 acquires the number of communication terminals currently connected to the wireless communication module (S305). The number of communication terminals connected to the wireless communication module is a value acquired for each time interval. Also, the number of communication terminals may be a mean value of the values acquired for each time interval during a predetermined period. The acquired number of communication terminals to be connected is stored in the memory unit 70. The order of acquiring the detection frequency of the radar signal Ls and the number of communication terminals is not particularly limited.

Figure 7:
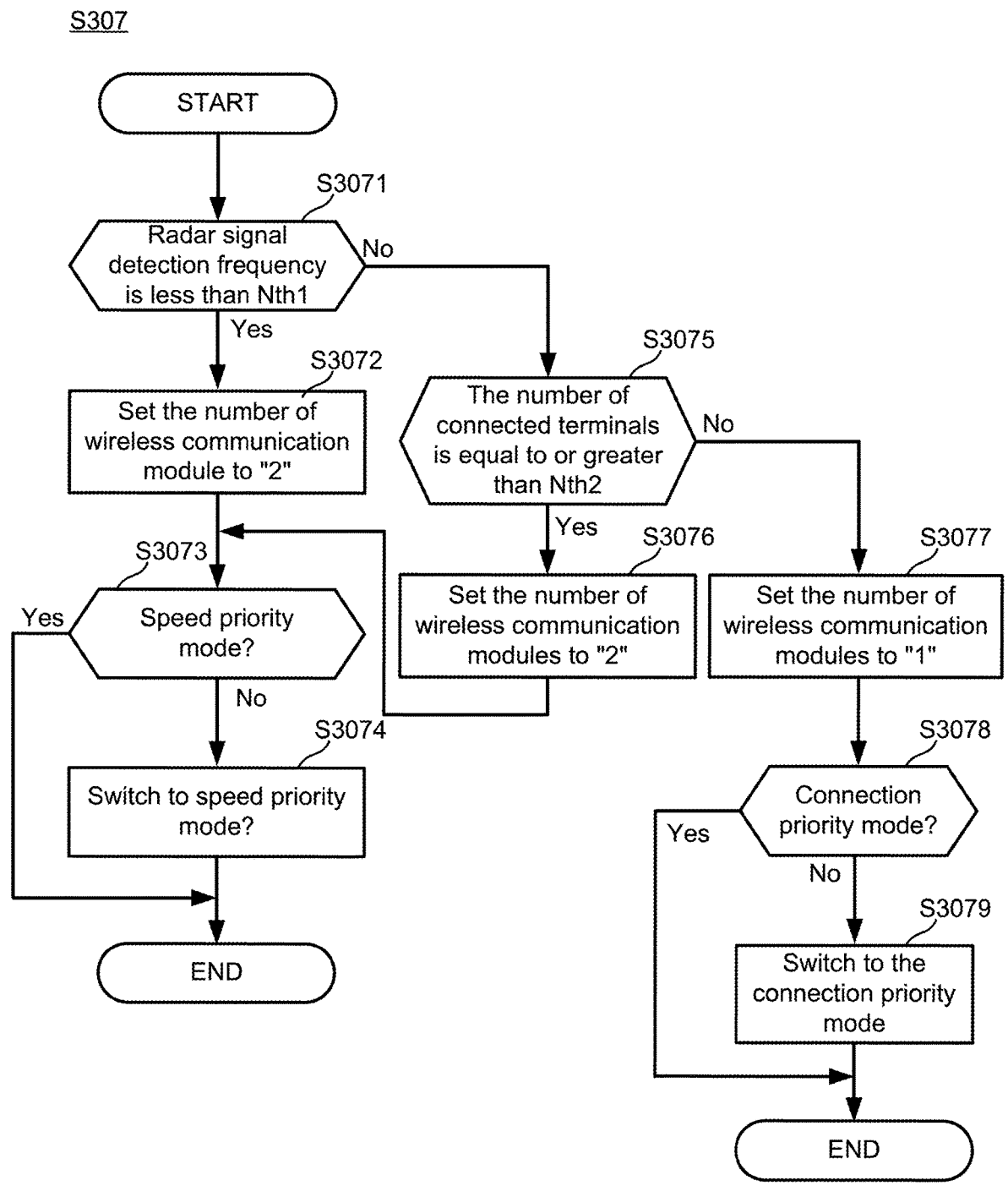
FIG. 7 is a flowchart illustrating a process of setting the number of wireless communication modules according to the first embodiment of the present disclosure.
Figure 8:
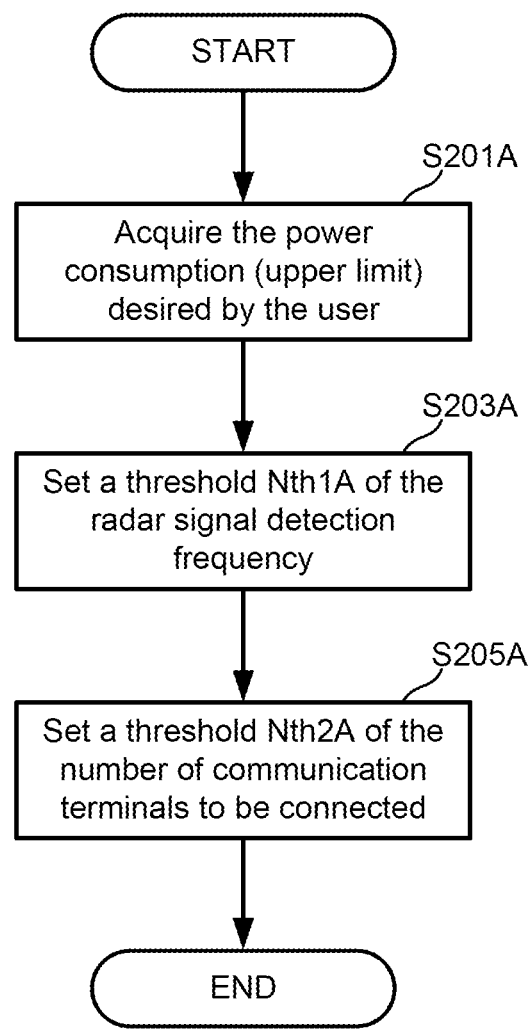
FIG. 8 is a flowchart illustrating a threshold setting process according to a second embodiment of the present disclosure.

Next, the control unit 50 performs a changing process of the number of wireless communication modules used for wireless communication (S307). FIG. 7 is an example of a flowchart showing a change process of the number of wireless communication modules S307. As shown in FIG. 7, the control unit 50 determines whether the detection frequency of the radar signal is less than the threshold Nth1 (in this case, Nth1=1) (S3071). When the detection frequency of the radar signal is less than the threshold Nth1 (S3071; Yes), the number of wireless communication modules used for wireless communication is set to be plural (S3072). Specifically, when the number of wireless communication modules currently used for wireless communication is "1", if the detection frequency of the radar signal within 24 hours is 0, the number of wireless communication modules used for wireless communication is set to "2". When there is a plurality of wireless communication modules (when the number of wireless communication modules is set to "2"), the control unit 50 determines whether the communication module M is in a speed priority mode (S3073). If it is in the speed priority mode (S3073; Yes), the speed priority mode is maintained. If it is not in the speed priority mode but in the connection priority mode (S3073; No), a mode switching process for switching from the connection priority mode to the speed priority mode is executed (S3074).

This mode switching process corresponds to switching the wireless communication of the wireless communication module M from the restricted state to the unrestricted state. As a result, all of the wireless communication modules are in the ISM state (unrestricted state) capable of wireless communication with the communication terminal 5. This state is the speed priority mode.

In the speed priority mode, the access point 3 is operated so that the communication bandwidth of the speed priority mode is larger than in the connection priority mode when both the wireless communication modules Ma 10 and Mb 20 can communicate with the communication terminal 5 (ISM state). As a result, even when many communication terminals 5 are connected to the access point 3, it is possible to suppress a decrease in the communication rate. In addition, in the speed priority mode, the wireless communication is restricted because the CAC is started when the radar signal Ls is detected as in the related art. However, if one of the two wireless communication modules is maintained in the ISM state, the communication terminal 5 can switch the channel and continue the wireless communication.

In the case where the radar signal detection frequency is one or more times (S3071; No.), the control unit 50 determines the number of communication terminals currently connected to the wireless communication module M (S3075). In this case, the threshold for the number of communication terminals to be connected is "60". In the case where the number of communication terminals currently connected is equal to or greater than the threshold Nth2 (S3075; Yes), the control unit 50 sets the number of wireless communication modules M used for wireless communication to be increased (S3076). Specifically, in the case where the detection frequency of the radar signal in 24 hours or less is once and the number of communication terminals currently connected is "80", the number of wireless communication modules currently used for wireless communication is set to "2" (S3076). In this case, the control unit 50 executes a determination process of the speed priority mode in order to set a communication mode to the speed priority mode (S3073).

In the case where the number of communication terminals currently connected is less than the threshold Nth2 (S3075; No), the number of wireless communication modules M used for wireless communication is set to be reduced (S3077). Specifically, in the case where the number of communication terminals currently connected is "40", the number of wireless communication modules currently used for wireless communication is set to "1". In this case, the control unit 50 executes a process of determining whether the mode is the connection priority mode (S3078). When the communication mode of the wireless communication module M is in the connection priority mode (S3078; Yes), the connection priority mode is maintained. When the wireless communication module M is in the speed priority mode, a process of switching to the connection priority mode is executed (S3079), and the connection priority mode is started. In the connection priority mode, when the wireless communication module Ma 10 detects the radar signal Ls, the control unit 50 disconnects the connection (the first connection) between the communication terminal 5 and the wireless communication module Ma 10 and changes the communication setting to the connection (the second connection) between the communication terminal 5 and the wireless communication module Mb 20. The control unit 50 repeats the setting process of the number of wireless communication modules S300 when the power is on.

The above-described communication control process ends when the power is turned off or switched to another communication control process at the access point 3.

As described above, in the case of the present embodiment, when the number of wireless communication modules is small, the time in which communication is interrupted is shortened, stable wireless communication is performed, and power consumption can be suppressed. In addition, when the number of wireless communication modules is large, the communication rate can be improved by increasing the bandwidth. Therefore, it is possible to perform wireless communication using an appropriate number of wireless modules according to the bandwidth and the usage environment input by the user by applying the present embodiment.

Second Embodiment

In the first embodiment of the present disclosure, although an example of setting the threshold for the number of communication terminals to be connected according to the bandwidth desired by the user is shown, a communication system that is different from the first embodiment will be described in the present embodiment. Specifically, an example of setting the threshold for the number of communication terminals to be connected based on the desired power consumption will be described. Also, descriptions of portions common to those of the first embodiment will be omitted as appropriate.

[2-1. Threshold Setting Process]

First, the user inputs the desired power consumption (for example, an upper limit of power consumption) of the wireless communication module M to the access point 3. The control unit 50 acquires the power consumption of the wireless communication module M (S201A). The acquired power consumption is stored in the memory unit 70.

The control unit 50 sets a threshold Nth1A of the radar signal detection frequency based on the acquired power consumption (S203A) and sets a threshold Nth2A of the number of communication terminals connected to the wireless communication module (S205A). The threshold Nth2A may be set based on the radar signal detection frequency and the number of wireless communication modules used for the wireless communication in addition to the power consumption desired by the user.

Using the present embodiment makes it possible to perform wireless communication while suppressing power consumption under the condition desired by the user.

Third Embodiment

In the first embodiment of the present disclosure, although an example of setting the threshold for the number of communication terminals to be connected according to the bandwidth desired by the user is shown, a communication device that is different from the first embodiment will be described in the present embodiment. Specifically, an example of setting the threshold of power consumption based on the number of communication terminals to be connected to the wireless communication module desired by the user. Also, descriptions of portions common to those of the first embodiment will be omitted as appropriate.

[3-1. Threshold Setting Process]

Figure 9:
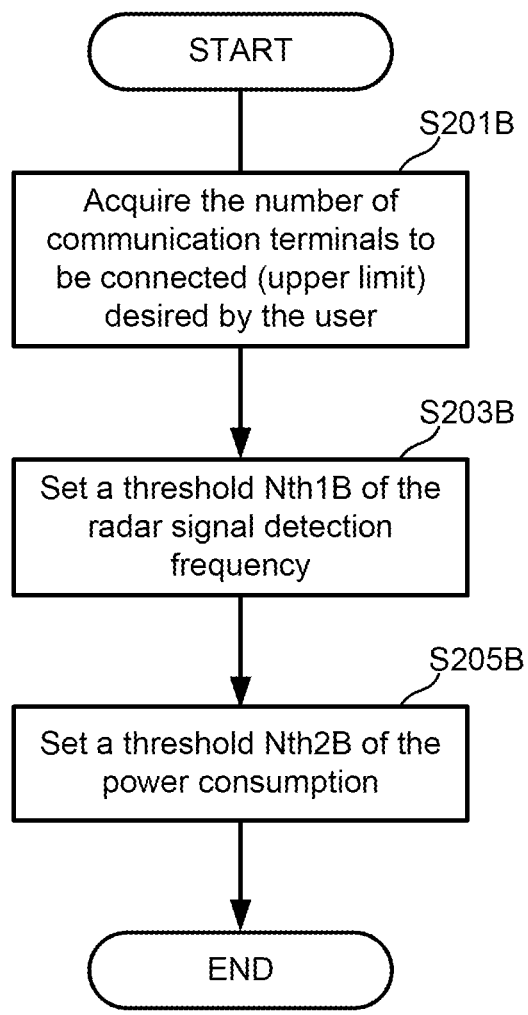
FIG. 9 is a flowchart illustrating a threshold setting process according to a third embodiment of the present disclosure.

FIG. 9 is a flowchart illustrating a threshold setting process S200B. In the threshold setting process S200B, first, the user inputs a desired number (for example, an upper limit of the communication terminal) of communication terminals connected to the wireless communication module to the access point 3. The control unit 50 acquires the number of communication terminals input by the user (S201B). The acquired number of communication terminals is stored in the memory unit 70.

The control unit 50 sets a threshold Nth1B of the radar signal detection frequency based on the acquired number of communication terminals (S203B) and sets a threshold Nth2B of the power consumption to be used by the wireless communication module M (S205B). The threshold Nth2B may be set based on the bandwidth of the wireless communication module or processing capacity (throughput) in addition to the number of communication terminals desired by the user.

[3-2. Setting Process of Number of Wireless Communication Modules]

Figure 10:
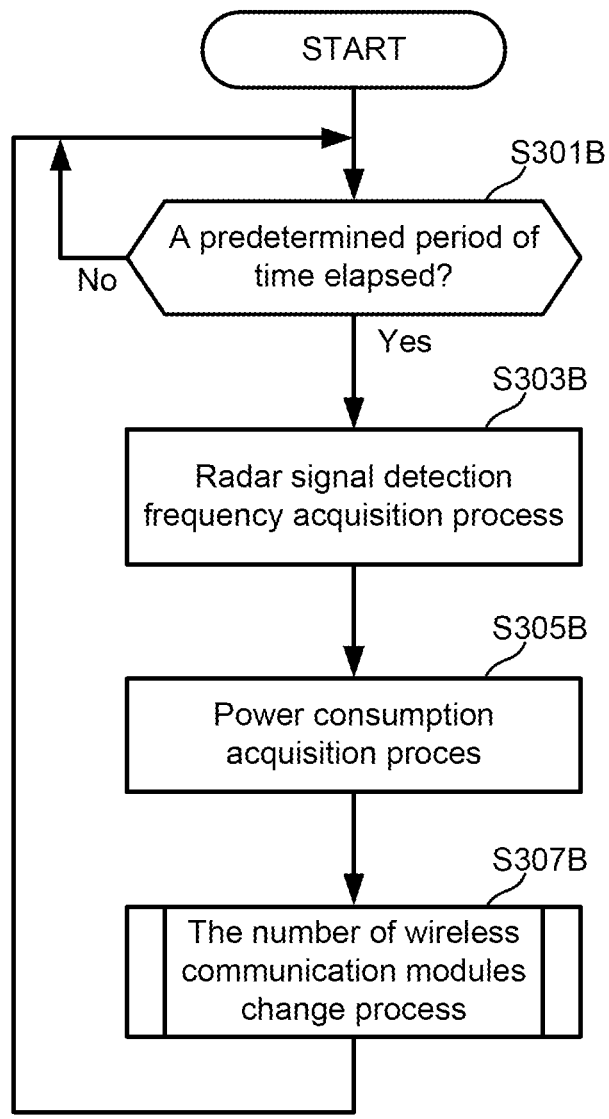
FIG. 10 is a flowchart illustrating a process of setting a communication module number according to the third embodiment of the present disclosure.

FIG. 10 is a flowchart for explaining a setting process of a number of wireless communication modules S300B. As shown in FIG. 10, in the setting process of the number of wireless communication modules S300B, first, the control unit 50 waits until a predetermined period of time elapses (S301B; No). When the predetermined period elapses (S301B; Yes), the control unit 50 acquires the number of detections (detection frequency) of the radar signal Ls detected by the wireless communication module M in the predetermined period (S303B). The acquired detection frequency of the radar signal Ls is stored in the memory unit 70. Next, the control unit 50 acquires the current power consumption in the wireless communication module M (S305B). The acquired power consumption is stored in the memory unit 70.

Figure 11:
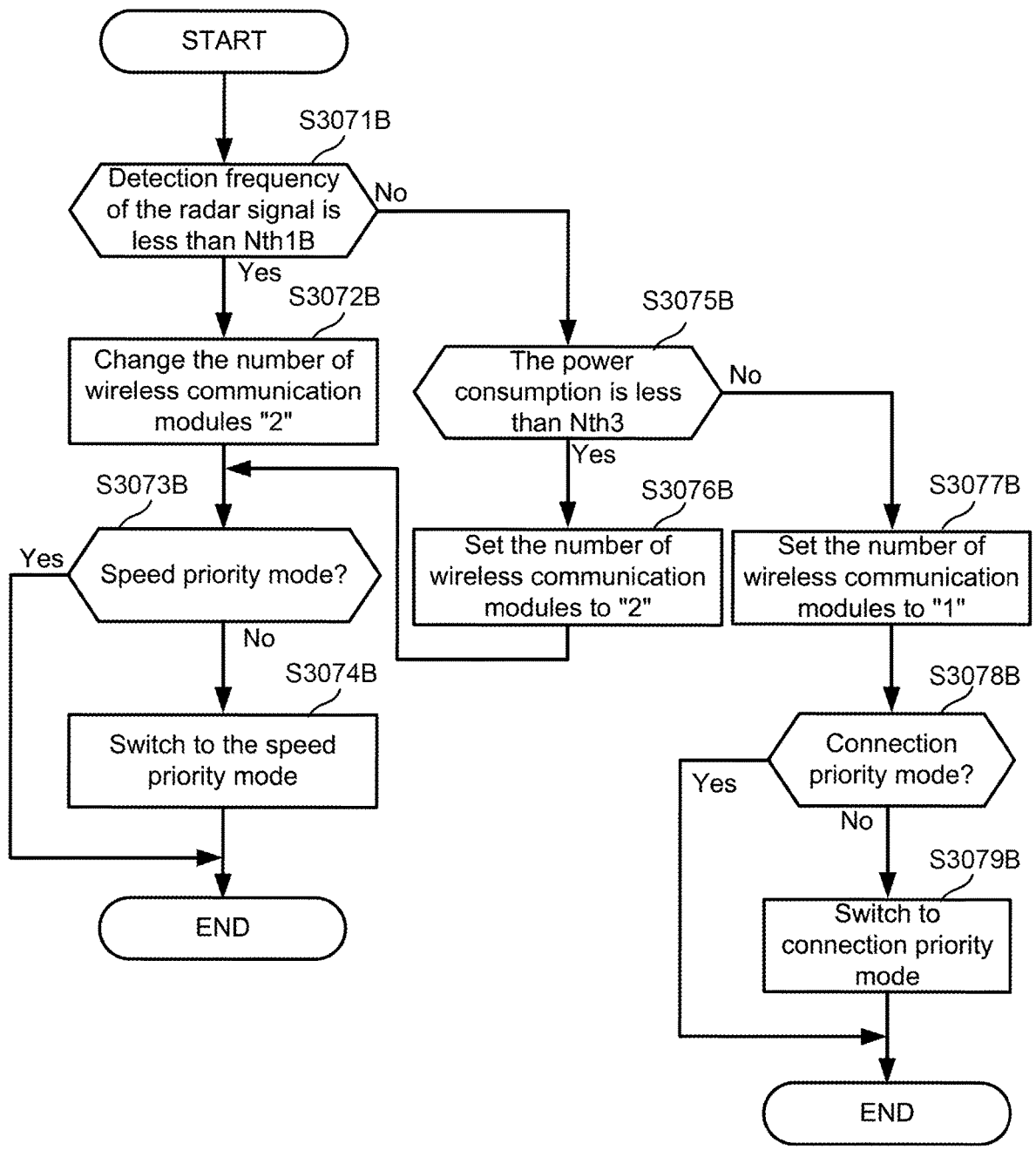
FIG. 11 is a flowchart illustrating a process of setting a communication module number according to the third embodiment of the present disclosure.

Next, the control unit 50 performs a changing process of the number of wireless communication modules used for wireless communication (S307B). FIG. 11 is an example of a flowchart showing a changing process of the number of wireless communication modules. As shown in FIG. 11, the control unit 50 determines whether the detection frequency of the radar signal is less than the threshold Nth1B (in this case, Nth1B=1) (S3071B). When the detection frequency of the radar signal is less than the threshold Nth1B (S3071B; Yes), the number of wireless communication modules used for wireless communication is set to "2" (S3072B). When the number of wireless communication modules is set to "2", the control unit 50 determines whether the communication module M is in the speed priority mode (S3073B). If the communication mode is the speed priority mode (S3073B; Yes), the speed priority mode is maintained. If the communication mode is not the speed priority mode but the connection priority mode (S3073B; No), the mode switching process for switching from the connection priority mode to the speed priority mode is executed (S3074B).

In the case where the radar signal detection frequency is one or more times (S3071B; No), the control unit 50 determines the current power consumption in the wireless communication module M (S3075B). In the case where the current power consumption is less than a threshold Nth3 (S3075B; Yes), the control unit 50 sets the number of wireless communication modules used for wireless communication to "2" (S3076B). In this case, since the control unit 50 sets the priority mode, the determination process of the speed priority mode is executed (S3073B).

In the case where the current power consumption is equal to or greater than the threshold Nth3 (S3075B; No), the number of wireless communication modules M used for wireless communication is set to be reduced (S3077B). Specifically, the number of wireless communication modules used for wireless communication is set to "1". In this case, the control unit 50 executes a process of determining whether the wireless communication module M is the connection priority mode (S3078B). When the communication mode is the connection priority mode (S3078B; Yes), the connection priority mode is maintained. When the wireless communication module M is in the speed priority mode, a switching process to the connection priority mode is executed (step S3079B), and the connection priority mode is started. The control unit 50 repeats the setting process of the number of wireless communication modules S300 when the power is on.

As described above, in the present embodiment, the bandwidth is increased by increasing the number of wireless communication modules when the power consumption is small. As a result, the communication rate can be improved. In addition, when the power consumption increases, the power consumption can be suppressed by reducing the number of wireless communication modules. Therefore, it possible to perform wireless communication using an appropriate number of wireless modules while suppressing power consumption according to the usage environment by applying the present embodiment.

Fourth Embodiment

In the present embodiment, an example of performing a setting process of a number of wireless communication modules S300C by acquiring time information will be described.

Figure 12:
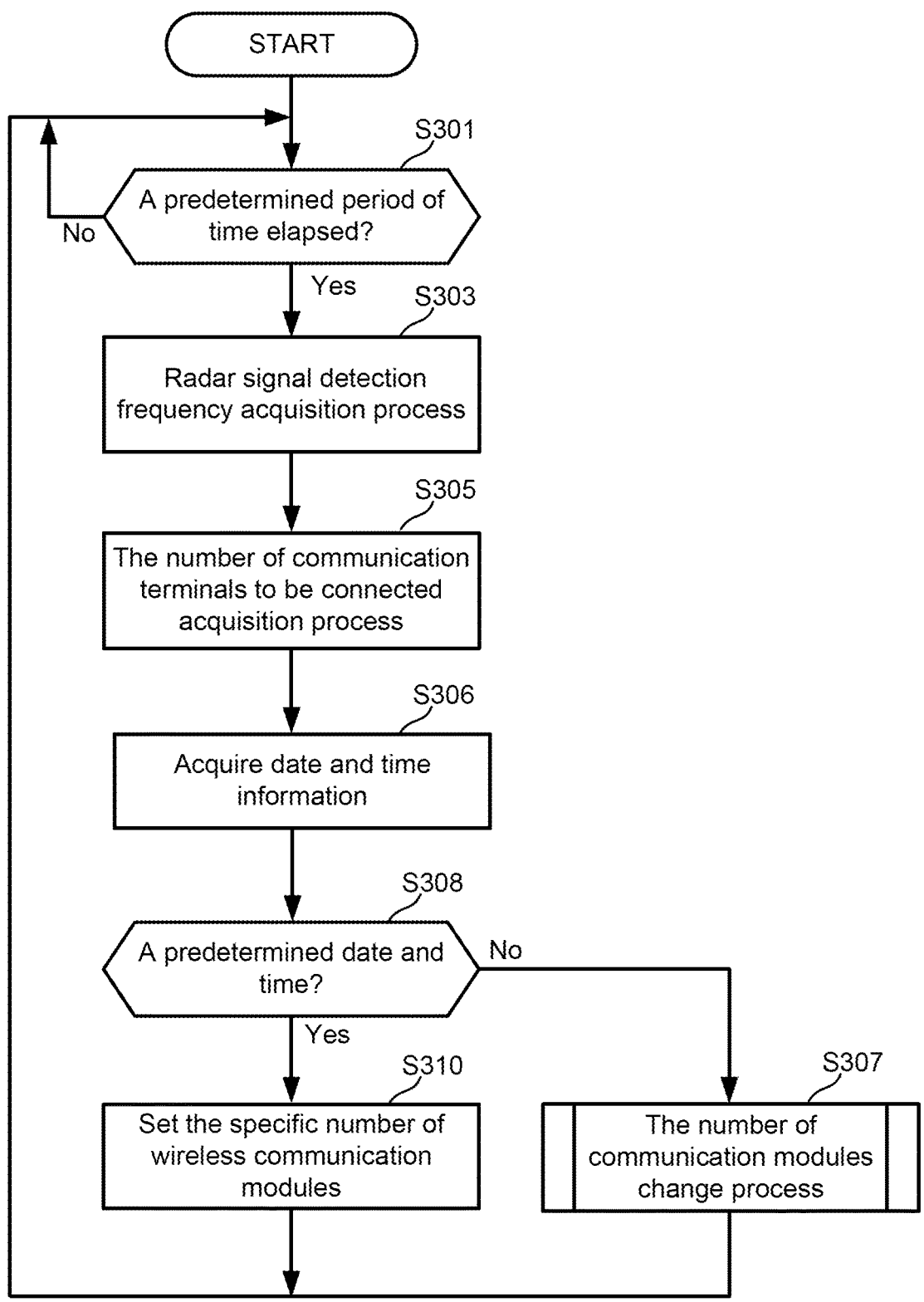
FIG. 12 is a flowchart illustrating a communication module number setting process according to a fourth embodiment of the present disclosure.

FIG. 12 is a flowchart illustrating a setting process of the number of wireless communication modules S300C. As shown in FIG. 12, in the setting process of the number of wireless communication modules S300C, first, the control unit 50 waits until a predetermined period of time elapses (S301; No). When the predetermined period elapses (S301; Yes), the control unit 50 acquires the number of detections (detection frequency) of the radar signal Ls detected by the wireless communication module M in the predetermined period (S303). The acquired detection frequency of the radar signal Ls is stored in the memory unit 70. Next, the control unit 50 acquires the number of communication terminals currently connected to the wireless communication module (S305). The acquired number of communication terminals to be connected is stored in the memory unit 70.

Next, the control unit 50 acquires date and time information (S306). Also, the acquisition timing of the date and time information is not particularly limited. In addition, the date and time information may be acquired from within the access point 3 or may be acquired from another device. The control unit 50 determines whether the acquired date and time information is a predetermined date and time (S308). In the case where the acquired date and time information is not a predetermined date and time (S308; No), the changing process of the number of wireless communication modules is performed (S307). The changing process of the number of wireless communication modules S307 is as described in the first embodiment.

On the other hand, in the case where the acquired date and time information is a predetermined date and time (S308; Yes), the control unit 50 sets the specific number of wireless communication modules (S310). The specific number of wireless communication modules may be set based on the bandwidth desired by the user, the internal information (e.g., the detection frequency of the radar signal, the number of communication terminals to be connected) of the access point, and the date and time information. Specifically, the number of wireless communication modules to be used may be set to "1" on Saturdays and Sundays when wireless communication is infrequent.

In the case of the present embodiment, a predetermined number of wireless communication modules is set at a predetermined date and time. Therefore, it is possible to reduce power consumption even if the user does not set the predetermined number of wireless communication modules, and it is possible to perform wireless communication using an appropriate number of wireless communication modules.

Fifth Embodiment

In the first embodiment of the present disclosure, although an example in which the control unit 50 performs the communication control process based on various information such as the bandwidth desired by the user, the detection frequency of the radar signal, and the acquired number of communication terminals to be connected stored in the memory unit 70 of the access point 3 is shown, the present disclosure is not limited thereto. In the present embodiment, an example in which a single wireless communication module is provided at a different access point will be described.

Figure 13:
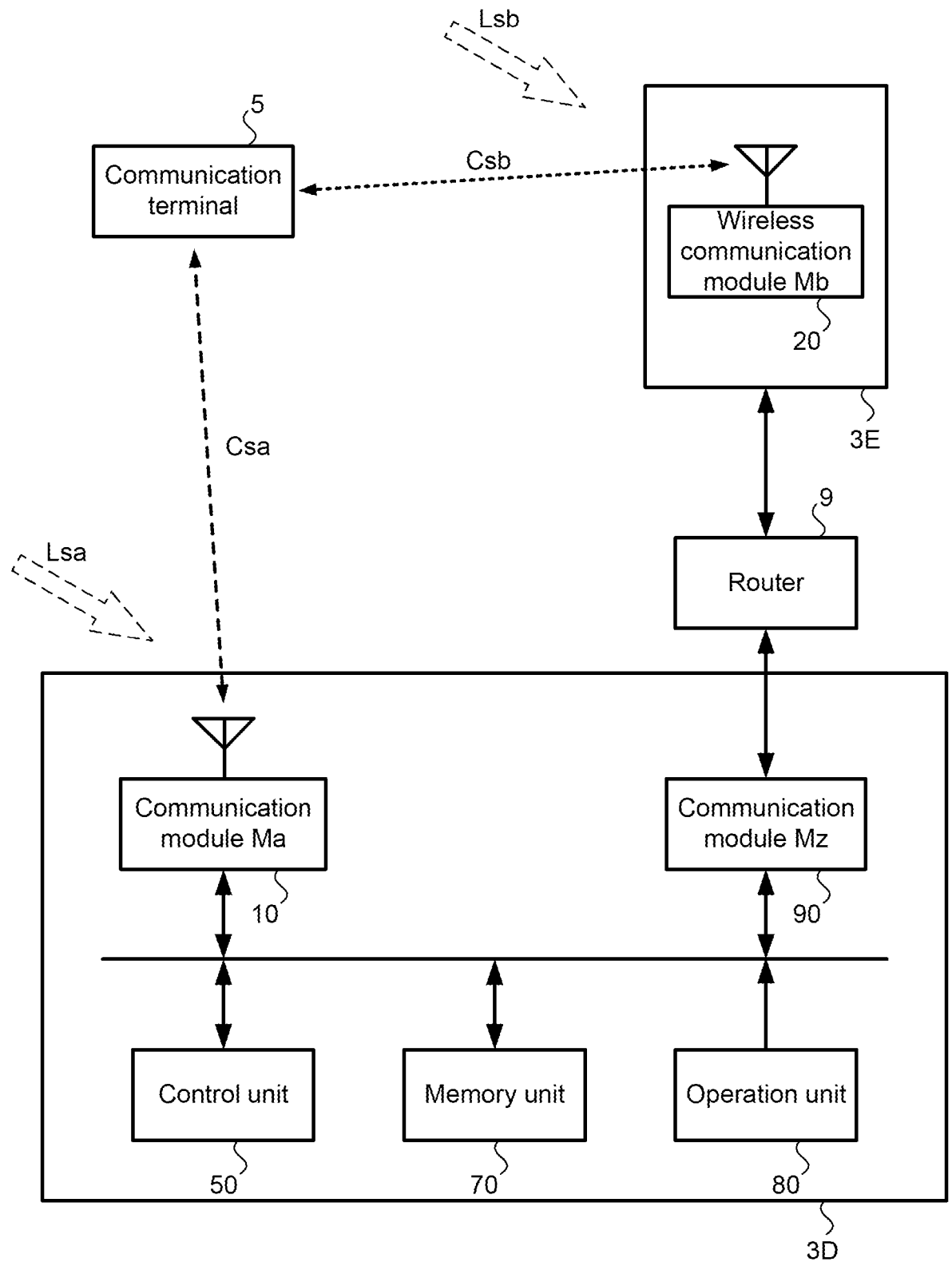
FIG. 13 is a diagram illustrating a configuration of a communication system according to a fifth embodiment of the present disclosure.

FIG. 13 is a configuration diagram of a communication system 1D. As shown in FIG. 13, the communication system 1D includes an access point 3D and an access point 3E in addition to the communication terminal 5 and the router 9. The access point 3D is the same as the access point 3 of the first embodiment except that it does not include the wireless communication module Mb. The access point 3E includes the wireless communication modular Mb 20. The access point 3D and the access point 3E are arranged in the same network segment. The control unit 50 of the access point 3D may perform the communication control process using various information stored in the access point 3E.

<Modification>

While an embodiment of the present disclosure is described above, it is understood that various modifications and changes can be made by those skilled in the art and that these modifications and changes also fall within the scope of the present invention. For example, the addition, deletion, or design change of components, or the addition, deletion, or condition change of processes as appropriate by those skilled in the art based on each embodiment are also included in the scope of the present invention as long as they are provided with the gist of the present disclosure.

In the first embodiment of the present disclosure, although an example in which various information such as the bandwidth desired by the user, the detection frequency of the radar signal, and the acquired number of communication terminals to be connected are stored in the memory unit 70 of the access point 3 is shown, the present disclosure is not limited thereto. The various information may be subjected to the communication control process using various information stored in the memory device of the communication device or server that is different from the access point 3.

In the first embodiment of the present disclosure, although an example in which the threshold for the number of communication terminals to be connected is determined based on the bandwidth desired by the user, and the number of wireless communication modules is changed according to the present number of communication terminals to be connected is shown, the present disclosure is not limited thereto. For example, the number of wireless communication modules may be changed based on other internal information of the access point 3. The threshold of an average throughput may be determined based on an upper limit of the number of connected wireless terminals desired by the user, and the number of wireless communication modules may be changed according to the current average throughput.

In addition, in the first embodiment of the present disclosure, although an example in which the theoretical value of the bandwidth in a predetermined communication standard is used for setting the threshold for the number of communication terminals to be connected is shown, the present disclosure is not limited thereto. For example, the lowest bandwidth (communication rate) or the mean value of the bandwidths among the communication standard used by the wireless terminal currently connected may be used.

In the first embodiment of the present disclosure, when calculating the threshold Nth2 of the number of communication terminals to be connected, although an example in which the coefficient is set based on the bandwidth desired by the user and the detection frequency of the radar signal is shown, the present disclosure is not limited thereto. The coefficient may be set based on other internal information of the access point 3, for example, the channel utilization rate of the wireless communication module M or a CRC error rate of the wireless communication module.

In the first embodiment of the present disclosure, although an example in which the threshold Nth2 of the number of communication terminals connected based on Equation 1 is calculated is shown, the present disclosure is not limited thereto. For example, the threshold for the number of communication terminals to be connected may be generated using a learned model generated based on machine learning in advance, or the number of wireless communication modules may be changed.

In addition, the threshold of the radar signal detection frequency may be set based on the number of consecutive radar signal detections at a constant time interval in a predetermined period. In the case where the detection frequency is equal to or greater than the threshold, the probability of detecting the radar signal is high, so that the number of communication modules may be reduced, and the connection priority mode may be preferentially set.

Also, in an embodiment of the present disclosure, although an example in which the control unit 50 sets the wireless communication module M to the connection priority mode is shown, the present disclosure is not limited thereto. For example, the communication setting (mode) that has already been set may be continuously used, or the communication setting (mode) may be set according to the bandwidth desired by the user.

Also, in the first embodiment of the present disclosure, although an example in which the radar signal is detected after a predetermined period of time elapses (S301: Yes) is shown, the present disclosure is not limited thereto. The number of detections (detection frequency) of the radar signal Ls may be acquired without waiting for a predetermined period of time to elapse (without performing the process of S301).

In the communication relay device according to an embodiment of the present disclosure, the internal information of the communication relay device may include a number of communication terminals connected to the communication relay device and a detection frequency of a predetermined radar signal detected by the communication relay device.

In the communication relay device according to an embodiment of the present disclosure, the program, when executed, further may cause the processor to: set a threshold for a number of communication terminals that can be connected to a single wireless communication module among the plurality of wireless communication modules based on the designated bandwidth, and wherein the number of wireless communication modules to be used for communication by the communication relay device is set based on the number of the communication terminals to be connected, the detection frequency of the predetermined radar signal, and the threshold.

In the communication relay device according to an embodiment of the present disclosure, the program, when executed, further may cause the processor to: set a threshold for a number of communication terminals that can be connected to a single wireless communication module among the plurality of wireless communication modules based on the designated bandwidth and the detection frequency of the predetermined radar signal, and wherein the number of wireless communication modules to be used for communication by the communication relay device is set based on the number of the communication terminals to be connected, the detection frequency of the predetermined radar signal, and the threshold.

In the communication relay device according to an embodiment of the present disclosure, the program, when executed, further may cause the processor to: acquire a designated power consumption of the communication relay device; and set a threshold for a number of communication terminals that can be connected to a single wireless communication module among the plurality of wireless communication modules based on the designated bandwidth and the designated power consumption of the communication relay device, and wherein the number of wireless communication modules to be used for communication by the communication relay device is set based on the number of the communication terminals to be connected, the detection frequency of the predetermined radar signal, and the threshold.

In the communication relay device according to an embodiment of the present disclosure, the plurality of wireless communication modules may include a first wireless communication module corresponding to a first channel in the 5 GHz band and a second wireless communication module corresponding to a second channel in the 5 GHz band, and the program, when executed, further causes the processor to: set a first connection between a plurality of communication terminals and the first wireless communication module; and change a setting from the first connection to a second connection between the plurality of communication terminals and the second wireless communication module in a case where the number of the communication terminals to be connected is less than the threshold and a radar signal corresponding to the first channel is detected.

In the communication relay device according to an embodiment of the present disclosure, the program, when executed, further causes the processor to: acquire date and time information, and wherein the number of wireless communication modules to be used for communication by the communication relay device is set based on the designated bandwidth, the internal information, and the date and time information in a case where the date and time information meets a predetermined condition.

In the communication control method according to and embodiment of the present disclosure, the internal information of the communication relay device may include a number of communication terminals connected to the communication relay device and a detection frequency of a predetermined radar signal detected by the communication relay device.

In the communication control method according to an embodiment of the present disclosure, setting a threshold for a number of communication terminals that can be connected to a single wireless communication module among the plurality of wireless communication modules based on the designated bandwidth, wherein the number of wireless communication modules to be used for communication by the communication relay device is set based on the number of the communication terminals to be connected, the detection frequency of the predetermined radar signal, and the threshold The communication control method according to an embodiment of the present disclosure may include setting a threshold for a number of communication terminals that can be connected to a single wireless communication module among the plurality of wireless communication modules based on the designated bandwidth and the detection frequency of the predetermined radar signal, wherein the number of wireless communication modules to be used for communication by the communication relay device is set based on the number of the communication terminals to be connected, the detection frequency of the predetermined radar signal, and the threshold.

The communication control method according to an embodiment of the present disclosure may include acquiring a designated power consumption of the communication relay device; and
setting a threshold for a number of communication terminals that can be connected to a single wireless communication module among the plurality of wireless communication modules based on the designated bandwidth and the designated power consumption of the communication relay device, wherein the number of wireless communication modules to be used for communication by the communication relay device is set based on the number of communication terminals to be connected, the detection frequency of the predetermined radar signal, and the threshold.

In the communication control method according to an embodiment of the present disclosure, the plurality of wireless communication modules includes a first wireless communication module corresponding to a first channel in the 5 GHz band and a second wireless communication module corresponding to a second channel in the 5 GHz band, and the communication control method further may include setting a first connection between a plurality of communication terminals and the first wireless communication module; and changing a setting from the first connection to a second connection between the plurality of communication terminals and the second wireless communication module in a case where the number of the communication terminals to be connected is less than the threshold and a radar signal corresponding to the first channel is detected.

In the communication control method according to an embodiment of the present disclosure further may include acquiring date and time information, wherein the number of wireless communication modules to be used for communication by the communication relay device is set based on the designated bandwidth, the internal information, and the date and time information in a case where the date and time information meets a predetermined condition.

What is claimed is:
1. A communication relay device, comprising:
a plurality of wireless communication modules configured to perform wireless communication with one or more communication terminals;
a processor; and
a memory configured to store a program, the program being executable by the processor to cause the processor to:
acquire a bandwidth per communication terminal, designated by a user, and internal information of the communication relay device;
set a threshold for a number of communication terminals that can be connected to a single wireless communication module among the plurality of wireless communication modules based on the bandwidth per communication terminal designated by the user; and
set a number of wireless communication modules among the plurality of wireless communication modules to be used for communication by the communication relay device based on (i) the threshold for the number of communication terminals that can be connected to the single wireless communication module that was set based on the bandwidth per communication terminal designated by the user and (ii) the internal information of the communication relay device.

2. The communication relay device according to claim 1, wherein
the internal information of the communication relay device includes a number of communication terminals connected to the communication relay device and a detection frequency of a predetermined radar signal detected by the communication relay device.

3. The communication relay device according to claim 2, wherein the number of wireless communication modules to be used for communication by the communication relay device is set based on the number of the communication terminals connected to the single wireless communication module, the detection frequency of the predetermined radar signal, and the threshold.

4. The communication relay device according to claim 3, wherein
the plurality of wireless communication modules includes a first wireless communication module corresponding to a first channel in the 5 GHz band and a second wireless communication module corresponding to a second channel in the 5 GHz band, and
the program, when executed, further causes the processor to:
set a first connection between a plurality of communication terminals and the first wireless communication module; and change a setting from the first connection to a second connection between the plurality of communication terminals and the second wireless communication module in a case where the number of the communication terminals connected to the first wireless communication module is less than the threshold and a radar signal corresponding to the first channel is detected.

5. The communication relay device according to claim 2, wherein
the program, when executed, further causes the processor to:
set the threshold for the number of communication terminals that can be connected to the single wireless communication module among the plurality of wireless communication modules based on the bandwidth per communication terminal designated by the user and the detection frequency of the predetermined radar signal, and
wherein the number of wireless communication modules to be used for communication by the communication relay device is set based on the number of the communication terminals connected to the single wireless communication module, the detection frequency of the predetermined radar signal, and the threshold.

6. The communication relay device according to claim 2, wherein
the program, when executed, further causes the processor to:
acquire a designated power consumption of the communication relay device; and
set the threshold for the number of communication terminals that can be connected to the single wireless communication module among the plurality of wireless communication modules based on the bandwidth per communication terminal designated by the user and the designated power consumption of the communication relay device, and
wherein the number of wireless communication modules to be used for communication by the communication relay device is set based on the number of the communication terminals connected to the single wireless communication module, the detection frequency of the predetermined radar signal, and the threshold.

7. The communication relay device according to claim 1, wherein
the program, when executed, further causes the processor to:
acquire date and time information, and wherein the number of wireless communication modules to be used for communication by the communication relay device is set based on the bandwidth per communication terminal designated by the user, the internal information, and the date and time information in a case where the date and time information meets a predetermined condition.

8. A communication control method, comprising:
acquiring a bandwidth per communication terminal, designated by a user, and internal information of a communication relay device comprising a plurality of wireless communication modules configured to perform wireless communication with one or more communication terminals;
setting a threshold for a number of communication terminals that can be connected to a single wireless communication module among the plurality of wireless communication modules based on the bandwidth per communication terminal designated by the user; and setting a number of wireless communication modules among the plurality of wireless communication modules to be used for communication by the communication relay device based on (i) the threshold for the number of communication terminals that can be connected to the single wireless communication module that was set based on the bandwidth per communication terminal designated by the user and (ii) the internal information of the communication relay device.

9. The communication control method according to claim 8, wherein
the internal information of the communication relay device includes a number of communication terminals connected to the communication relay device and a detection frequency of a predetermined radar signal detected by the communication relay device.

10. The communication control method according to claim 9,
wherein the number of wireless communication modules to be used for communication by the communication relay device is set based on the number of the communication terminals connected to the single wireless communication module, the detection frequency of the predetermined radar signal, and the threshold.

11. The communication control method according to claim 10, wherein
the plurality of wireless communication modules includes a first wireless communication module corresponding to a first channel in the 5 GHz band and a second wireless communication module corresponding to a second channel in the 5 GHz band, and
the communication control method further comprises:
setting a first connection between a plurality of communication terminals and the first wireless communication module; and
changing a setting from the first connection to a second connection between the plurality of communication terminals and the second wireless communication module in a case where the number of the communication terminals connected to the first wireless communication module is less than the threshold and a radar signal corresponding to the first channel is detected.

12. The communication control method according to claim 9, further comprising:
setting the threshold for the number of communication terminals that can be connected to the single wireless communication module among the plurality of wireless communication modules based on the bandwidth per communication terminal designated by the user and the detection frequency of the predetermined radar signal,
wherein the number of wireless communication modules to be used for communication by the communication relay device is set based on the number of the communication terminals connected to the single wireless communication module, the detection frequency of the predetermined radar signal, and the threshold.

13. The communication control method according to claim 9, further comprising:
acquiring a designated power consumption of the communication relay device; and
setting the threshold for the number of communication terminals that can be connected to the single wireless communication module among the plurality of wireless communication modules based on the bandwidth per communication terminal designated by the user and the designated power consumption of the communication relay device, wherein the number of wireless communication modules to be used for communication by the communication relay device is set based on the number of communication terminals connected to the single wireless communication module, the detection frequency of the predetermined radar signal, and the threshold.

14. The communication control method according to claim 8, further comprising:

acquiring date and time information, wherein the number of wireless communication modules to be used for communication by the communication relay device is set based on the bandwidth per communication terminal designated by the user, the internal information, and the date and time information in a case where the date and time information meets a predetermined condition.

15. A non-transitory computer readable storage medium storing a program for causing a computer to:

acquire a bandwidth per communication terminal, designated by a user, and internal information of a communication relay device comprising a plurality of wireless communication modules configured to perform wireless communication with one or more communication terminals;

set a threshold for a number of communication terminals that can be connected to a single wireless communication module among the plurality of wireless communication modules based on the bandwidth per communication terminal designated by the user; and set a number of wireless communication modules among the plurality of wireless communication modules to be used for communication by the communication relay device based on (i) the threshold for the number of communication terminals that can be connected to the single wireless communication module that was set based on the bandwidth per communication terminal designated by the user and (ii) the internal information of the communication relay device.

* * * * *